Aug. 14, 1934.　　F. A. BRAUCHT ET AL　　1,970,357
MEANS FOR MOUNTING LENSES
Filed Oct. 3, 1931
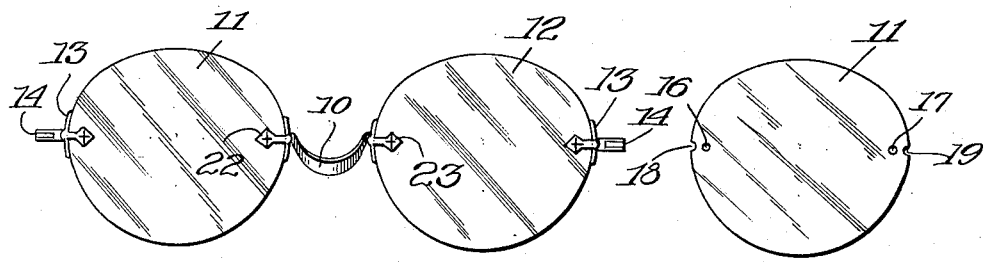
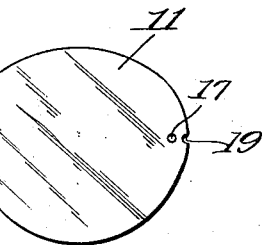
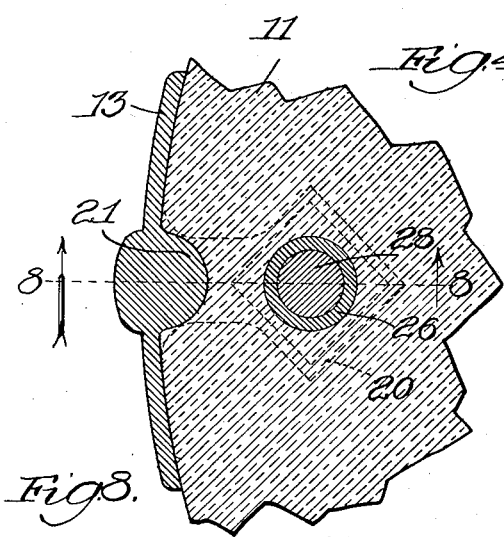
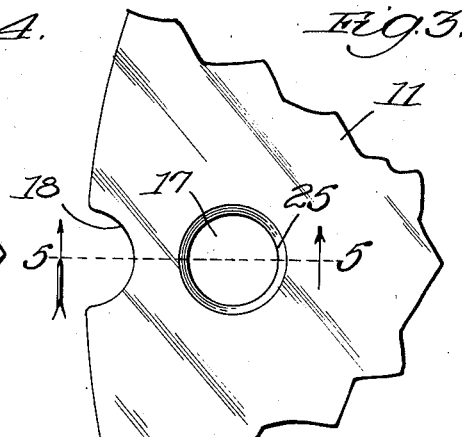
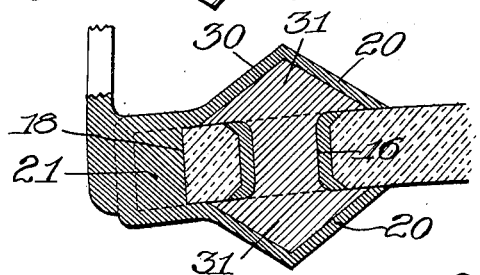
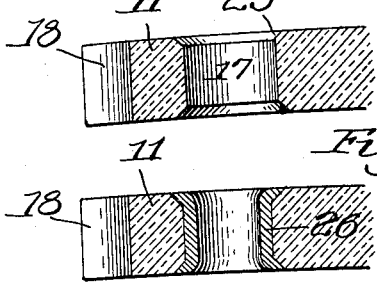
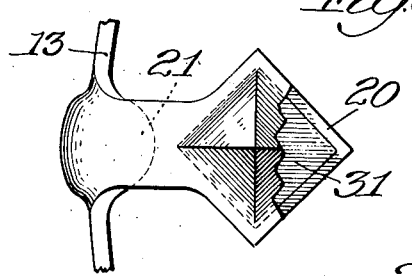
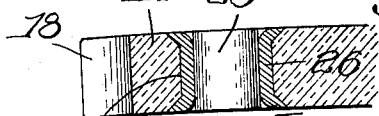

Patented Aug. 14, 1934

1,970,357

UNITED STATES PATENT OFFICE 1,970,357

MEANS FOR MOUNTING LENSES

Frederick A. Braucht and Austin B. Belgard, Chicago, Ill., assignors to Belgard-Spero, Inc., a corporation of Delaware Application October 3, 1931, Serial No. 566,734

4 Claims. (Cl. 88—47)

The invention relates broadly to that class of devices known as eyeglasses or spectacles, and particularly to means for mounting lenses.

A preferred form of the invention is embodied in spectacles having lenses which are secured to the bridge and bows of the spectacles. Holes are drilled through the lenses at the points where they are to be fastened to the bridge and bows, the lenses being also provided with notches in their edges in alinement with said drilled holes. A tubular metallic rivet is secured in each of the drilled holes and is adapted to hold a plug of solder which is placed in the rivet before the lenses are assembled with the bridge and bows. The bridge and the bracket members to which the bows are pivoted are bifurcated in such manner that the bifurcations may be slipped over the lenses so that they straddle the tubular rivets and the plugs of solder carried thereby. Each bifurcation is provided on its inner side with a pocket in which a small quantity of solder is placed. When the bridge and the brackets have been assembled with a lens, the solder is subjected to heat in any suitable manner so that the solder carried in the pockets of the bifurcations and the solder carried by the tubular rivets, fuses and becomes an integral member which secures the bifurcations to the lens. The brackets and bridge are provided with lugs which fit snugly in the notches of the lens and assist the solder in holding the lens firmly assembled with the bridge and brackets.

Other objects and advantages will become apparent as the following description progresses, reference being had to the accompanying drawing, wherein:

Figure 1 is a front elevation of a pair of spectacles which embody the invention;

Figure 2 is a front elevation of one of the lenses forming parts of the spectacles shown in Figure 1;

Figure 3 is an enlarged fragmentary view of the lens shown in Figure 2;

Figure 4 is an enlarged fragmentary section taken through a lens and a bracket of the improved spectacles, the section being taken in the plane of the lens;

Figure 5 is a section taken on line 5—5 of Figure 3;

Figure 6 is a section taken on the same line as Figure 5, but showing a tubular rivet inserted in a hole which is drilled through the lens;

Figure 7 is a section taken on the same line as Figures 5 and 6, but shows a plug of solder inserted in a tubular rivet;

Figure 8 is a section taken on line 8—8 of Figure 4, and

Figure 9 is a fragmentary front elevation of a bracket forming part of the improved spectacles, the bracket being partly broken away to illustrate certain details of construction.

Referring to the drawing wherein a preferred embodiment of the invention is disclosed, the reference character 10 designates generally the metallic bridge of a pair of spectacles which embody the invention. Secured to the bridge 10 are lenses 11 and 12 which have metallic brackets 13 fastened thereto, each bracket 13 having a bow 14 pivoted thereto. As far as the present invention is concerned, the lenses 11 and 12 are identical in construction and as best shown in Figures 2 and 3, each lens is provided with drilled holes 16 and 17 and notches 18 and 19, the notches 18 and 19 being formed in the edge of the lens in such manner that the notch 18 is in close proximity to the hole 16 and the notch 19 is in close proximity to the hole 17.

Referring specifically to the lens 11, it will be noted that the hole 16 and the notch 18 are adapted to co-operate with the associated bracket 13 to secure the associated bow 14 to the lens and that the hole 17 and the notch 19 are adapted to co-operate with the bridge 10 to secure the lens thereto.

The bracket 13 is formed with bifurcations 20 adapted to be slipped over the edge of the lens in such manner that a lug 21 formed on the bracket will seat snugly in the notch 18 and the bifurcations will straddle the hole 16.

The bridge 10 is formed with bifurcations 22 and 23 which are preferably identical in construction with the bifurcations 20. The bifurcations 22 straddle the holes 17 provided in the lenses 11 and 12. The bridge is formed with lugs (not shown) which are preferably identical in construction with the lugs 21 and are adapted to seat snugly in the notches 19 of the lenses 11 and 12.

As best shown in Figures 3, 5, 6, 7 and 8, the drilled holes 16 and 17 are beveled or enlarged at their outer ends as indicated at 25. Each drilled hole receives a metallic tubular rivet 26 which is preferably formed from brass or copper. The ends of each rivet 26 are riveted over to seat in the beveled portions 25 of the drilled holes so that the outer ends of the rivets are substantially flush with the front and back surfaces of the lens. After the rivets 26 have been secured in the drilled holes of the lenses, plugs 28 of solder are inserted in the rivets as illustrated in Figure 7. The lugs 28 being preferably of such diameter that they must be pressed into place.

As illustrated in Figure 8, each of the bifurcations 20 (and also the bifurcations 22 and 23) is provided with a pocket 30 adapted to hold a quantity of solder 31. The solder 31 is placed in the pockets 30 before bridge 10 and the brackets 13 are assembled with the lenses. After the bridge and the brackets have been assembled with the lenses, the solder is subjected to heat in any suitable manner so that it fuses and the solder 31 joins the solder 28 to form an integral member, in each instance, securing the associated bifurcations to the associated lens.

The solder prevents the bifurcations from being withdrawn from the lenses. The lugs 21 and the corresponding lugs (not shown) on the bridge 10 prevent the brackets and the bridge from being twisted or turned around the axes of the rivets.

The solder employed is preferably of the type described as "soft" solder, as distinguished from "hard" solder, such as "gold solder".

It will be readily understood that the lenses with their tubular rivets and plugs of solder may be sold as articles of commerce separately from the bridges and bows, the latter parts being also adapted to be sold separately with solder in the pockets of the bifurcations.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible, in view of the prior art.

We claim:

1. The combination with a lens having a hole formed therethrough, of a tubular metallic rivet seated in said hole, a metallic member having bifurcations disposed to straddle said tubular rivet, said bifurcations being provided with pockets facing said rivet, and solder extending through said rivet and into said pockets to secure said bifurcations to said rivet.

2. The combination with a lens having a hole formed therethrough, said hole flaring outwardly at its ends, a tubular rivet seated in said hole and having its ends riveted over to secure it to said lens, a metallic member having bifurcations disposed to straddle said rivet and said hole, said bifurcations being provided with pockets facing said rivet, and solder extending through said rivet and into said pockets to secure said bifurcations to said rivet.

3. The combination with a lens having a hole formed therethrough and provided with a notch in its edge opposite said hole, of a tubular metallic rivet extending through said hole, a metallic member having a lug seated in said notch and having bifurcations disposed to straddle said hole and said rivet, said bifurcations being provided with pockets facing said hole, and solder extending through said rivet and into said pockets for securing said bifurcations to said rivet.

4. The combination with a lens having a hole formed therethrough, of a tubular metallic rivet seated in said hole, a metallic member having bifurcations disposed to straddle said hole, said bifurcations being provided with pockets facing the free ends of said rivet, and a bonding material extending into said rivet and said pockets to secure said bifurcations to said rivet.

AUSTIN B. BELGARD.
FREDERICK A. BRAUCHT.